(12) United States Patent
Bang

(10) Patent No.: US 7,469,780 B2
(45) Date of Patent: Dec. 30, 2008

(54) APPARATUS FOR A SORTING SYSTEM AND METHOD FOR SORTING

(75) Inventor: Michael Bang, Ry (DK)

(73) Assignee: Linco Food Systems A/S, Trige (DK)

( * ) Notice: Subject to any disclaimer, the term of this patent is extended or adjusted under 35 U.S.C. 154(b) by 201 days.

(21) Appl. No.: 10/554,221

(22) PCT Filed: Apr. 26, 2004

(86) PCT No.: PCT/DK2004/000286

§ 371 (c)(1),
(2), (4) Date: Jul. 13, 2006

(87) PCT Pub. No.: WO2004/094279

PCT Pub. Date: Nov. 4, 2004

(65) Prior Publication Data

US 2007/0023258 A1 Feb. 1, 2007

(30) Foreign Application Priority Data

Apr. 24, 2003 (DK) ............................... 2003 00614

(51) Int. Cl.
*B65G 17/32* (2006.01)
(52) U.S. Cl. ............................. 198/370.07; 198/370.08
(58) Field of Classification Search ............ 198/370.07, 198/370.08, 457.07, 598
See application file for complete search history.

(56) References Cited

U.S. PATENT DOCUMENTS

| 4,564,105 | A | * | 1/1986 | Brouwer et al. | ........ 198/370.08 |
| 4,576,117 | A | | 3/1986 | Garber et al. | |
| 5,655,643 | A | | 8/1997 | Bonnet | ................... 198/370.08 |
| 6,041,910 | A | * | 3/2000 | Avery et al. | ............ 198/370.07 |
| 6,220,422 | B1 | * | 4/2001 | Lee | ........................ 198/370.07 |
| 6,536,580 | B1 | | 3/2003 | Fritzsche | |

FOREIGN PATENT DOCUMENTS

| CA | 1257557 | 7/1989 |
| SU | 1461719 | 2/1989 |
| WO | WO 03/002438 A1 | 1/2003 |

* cited by examiner

*Primary Examiner*—James R Bidwell
(74) *Attorney, Agent, or Firm*—Antonelli, Terry, Stout & Kraus, LLP.

(57) ABSTRACT

The present invention relates to an apparatus (1) for a sorting system comprising an activating member (2), a fastening bracket (3), and a discharge arm (4) which at an end part (5) is pivotally connected with the fastening bracket (3) at a side (6) of a conveyor (7), where the discharge arm (4) by means of the activating member (2) is adapted for being swung between a passive position (9) approximately parallel to the side (6) of the conveyor (7) and a number of active angular positions (8) in relation to the conveying direction (A) of the conveyor (7), where the activating member (2) comprises an electrically driven stepping motor or servomotor having a control unit being adapted for determining a pattern of motion and/or speed profile of the discharge arm (4).

20 Claims, 3 Drawing Sheets

APPARATUS FOR A SORTING SYSTEM AND METHOD FOR SORTING

BACKGROUND OF THE INVENTION

1. Field of the Invention

The present invention relates to an apparatus for a sorting system and furthermore relates to a method for sorting by means of an apparatus according to the invention.

2. Description of the Prior Art

Today, apparatuses with discharge arms are used for sorting of items on a conveyor in connection with for example a belt weighing device, a grader, a sorter, a sizer, or similar machinery. Such discharge arms can work in two ways in that the discharge arm either draws or guides the item laterally off the conveyor, or the item is thrown off the conveyor.

In known apparatuses of the this type the discharge arms are pneumatically controlled with pneumatic cylinders connected to a central compressed-air unit supplying compressed air to the cylinders when the discharge arm is to be swung over the conveyor in order to catch an item.

In such known apparatuses having a discharge arm driven by a pneumatic cylinder, it is very difficult to obtain a uniform pressure in the pneumatic cylinders, since the mechanical friction may vary. This means that it is difficult to control the precise position of the discharge arm when it is being swung over the conveyor. As it is not possible to precisely control the position of the discharge arm, it may be difficult, irrespective of the lateral position of the item on the conveyor, to have the item led to the correct discharge position along the side edge of the conveyor, and consequently, there will be a high spillage percentage when the items hit the wrong place or are led to an incorrect discharge position.

A contributory cause of the fact that a pneumatic cylinder is not well-suited is that there is clearance and/or elasticity in the pneumatic cylinder, and a certain delay when compressed air is applied to it. Especially in conveyors where a number of apparatuses are provided in a row along the edge of the conveyor, it is a problem to apply pneumatically driven equipment because it is almost impossible to keep the same pressure level in all the cylinders. The uneven pressure depends on the capacity of the compressor and any leakages in the piping or hosing system between the apparatuses.

SUMMARY OF THE INVENTION

On this background, it is the purpose of the present invention to provide an apparatus for a sorting system, which apparatus in a simple way ensures a very precise control of one or more discharge arms, and a method for the use of such an apparatus.

This is achieved, respectively, by means of an apparatus, by the activating member being constituted by an electrically driven stepping motor or servomotor having a control unit being adapted for determining a pattern of motion and/or speed profile of the discharge arm, and by means of a method in which the sorting of items on the conveyor is by means of the following method steps:

the items are either weighed and/or quality/type graded before they are placed on the conveyor, or weighed on a first part of the conveyor;

the items pass the sensors placed above or along the conveyor;

the sensors register the size and/or lateral and longitudinal position of the items on the conveyor, and at the same time, the sensors give out a control signal to the control unit of the apparatus;

before the items reach the discharge arm, the discharge arm is turned from a passive position to an active angular position in relation to the conveying direction of the conveyor;

the discharge arm leads the items to a predetermined discharge position along the side of the conveyor.

Below a sorting system is described which preferably is used for sorting of foods, but the invention may also be applied within other areas where items are sorted according to weight and/or quality/type, position on the conveyor, and size, etc. This may for example be the sorting of parcels within postal services, sorting of waste, and/or sorting of items in an industrial enterprise.

The electrically driven activating member may be an electrically driven motor, for example a stepping motor or a servomotor, or an electrical actuator or an actuator driven hydraulically by means of either water or oil.

By using an activating member in the form of an electrically driven stepping motor or servomotor, precise and uniform sorting of items on a conveyor is achieved. Using an electrical stepping motor or servomotor thus makes it possible to achieve a high level of precision for repeated functions and full control of acceleration, position, and speed.

In order to be able to use a specific discharge arm for guiding a specific item out from the conveyor, the apparatus furthermore comprises a control unit being adapted for receiving at least one control signal from a number of sensors being adapted for determining the lateral and longitudinal position of an item on the conveyor, and which are operatively connected with the activating member.

When the item passes the sensors, the sensors will, depending on their type, be able to register at least the lateral and the longitudinal position of the item on the conveyor so that the control signal received by the control unit of the apparatus can be used directly as a control parameter for the control unit.

In order to be able to determine the lateral and longitudinal position of the item on the conveyor, the sensors, for example photoelectric cells, are placed above and/or along the conveyor. By placing a number of laterally placed sensors preferably transversely over the conveyor, it will be possible to use different types of sensors. This may for example be sensors using different types of techniques such as infrared sensors, photoelectric sensors, and similar sensors.

An alternative to the above-mentioned sensor types can be that the sensors apply laser technology and are placed above and/or along the conveyor. The special thing about laser technology is that it can give out a single laser beam which can be used for measuring the distance to the item. This principle is used within the building industry where there are "measuring tapes" using laser technology.

If it is not necessary to know the three-dimensional size of the item, the sensors can be placed either transversely above the conveyor or along the sides of the conveyor.

A number of sensors placed at mutually different angles towards the conveyor will be able to produce very precise registrations of the sizes and positions of the items on the conveyor.

As the activating member is an electrically driven motor, which is activated from a control unit, it is important that the control unit can calculate/interact with the control signals that the control unit receives from the sensors. Therefore the motor comprises a pre-programmed control unit being adapted for utilizing the control signal from the sensors for determining a pattern of motion of the discharge arm. The pre-programmed control unit contains patterns of motion of the discharge arm that are determined by the lateral and longitudinal position and/or weight and/or quality/type of the item so that when the control unit receives a control signal from the sensors, it will retrieve the pre-programmed pattern of motion which results in the item being led out from the conveyor at the right time and to the correct position. The pattern of motion may thus depend on the lateral position and/or weight and/or quality/type.

If the apparatus is to be used for batch sorting where a specific total weight of a number of items is to be achieved, the control unit must furthermore comprise means for counting the registered weight of the items that have been sorted out by means of the apparatus. This may be a simple electronic chip having a counter and/or sum up function.

To ensure that the items are led by the discharge arm and out from the conveyor, the discharge arm is provided with a slightly spoon-formed front. This form means that when the items reach the front side of a discharge arm, they will be taken out from the conveyor when the discharge arm is turning towards the discharge position. It may be an advantage that items that are difficult to handle, for example frozen items, are carried along by the spoon-formed front instead of being hit back onto or over the sides of the conveyor of which there will be a risk if the front side of the discharge arm is entirely flat.

In order to be able to use the apparatus in an optimum manner for sorting of items on a conveyor, sorting is by means of a method comprising the following steps:
   the items are either weighed and/or quality/type graded before they are placed on the conveyor, or they are weighed and/or quality/type graded on a first part of the conveyor;
   the items pass the sensors placed above or along the sides of the conveyor;
   the sensors register the size and/or lateral and longitudinal position of the items on the conveyor, and at the same time, the sensors give out a control signal to the control unit of the apparatus;
   before the items reach the discharge arm, the discharge arm is turned from a passive position to an active angular position in relation to the conveying direction of the conveyor;
   the discharge arm leads the items to a predetermined discharge position along said side of the conveyor.

In case of batch sorting or sorting of items by weight, it is necessary that there is a weighing apparatus at some point in the production plant for registering the weight of the individual items so that it is possible to have the individual items sorted out to the correct discharge positions whereby production is optimized as residual items and incorrect sorting are avoided.

In an embodiment of the invention, weighing and/or quality/type grading may be effected before the items are brought onto the conveyor whereby the only thing that the sensors must register is the lateral position of the item on the conveyor. In an alternative embodiment of the invention, weighing and/or quality/type grading of the items will be effected on a first part of the conveyor where this first part of the conveyor can be placed either in front of the sensors or in direct connection with the sensors. However, the most important thing is that the item is weighed and/or quality/type graded before it reaches an apparatus having a discharge arm.

When the items pass the sensors, registration of size and/or lateral position of the items on the conveyor is effected. In most cases it will be sufficient to register the lateral position of the item on the conveyor in order to ensure that the discharge arm is turned to the desired angular position, but in certain cases it will furthermore be desirable to know the size of the item. This may for example be the case when sorting items that are to have a specific total weight, but which must not take up more space than strictly necessary.

When the item has been weighed/measured and/or quality/type graded, the sensors send a control signal to the control unit of the apparatus so that the control unit knows when it is to activate the activating member whereby the discharge arm is swung or turned. When the control unit receives the control signal, it will compare it to the pre-programmed control unit and thereby determine the angular position in which the discharge arm must be placed in order to be able to pull the item out from the conveyor.

The angular position corresponds to the weight/size and/or quality/type of the item so that when the item hits the discharge arm, it is led away to a pre-determined discharge position along the side of the conveyor. As the angular position is calculated for each individual item, it is easy to calculate and turn the discharge arm on the basis of the lateral position of the item on the conveyor, weight/size and/or quality/type of the item, and speed of the conveyor, so that items that are to be sorted out opposite the apparatus can be sorted out to a pre-determined discharge position. An alternative is that several pre-determined discharge positions are provided for the same apparatus, but this requires very precise registration, with low measurement tolerances, of the weight and position of the items in order to sort out the items by means of an apparatus.

As most sorting systems should preferably be capable of sorting items to different discharge positions, it is necessary that a number of apparatuses are placed along the conveyor. In order to have these apparatuses interact and thereby ensure that items are taken out by the desired apparatuses, the sensors are common to a number of apparatuses arranged in a row along the side of the conveyor. Thereby an overall control unit will be capable of controlling the sensors and of determining to which apparatus a control signal should be sent.

Instead of a moveable conveyor, the support on which the items are conveyed may be stationary and having a smooth surface so that it is the items that move across the inactive surface. It will then be necessary to have a sensor which in addition to size and weight and/or quality/type, can register the speed at which the item passes the sensors so that the discharge arms can be activated at the right time.

In an alternative embodiment of the invention, the apparatus for sorting may comprise an activating member, a fastening bracket, and a discharge arm which at an end part is pivotally connected with the fastening bracket at a side of an overhead conveyor where the discharge arm by means of the activating member can be swung between a passive position approximately parallel to the side of the overhead conveyor and a number of active angular positions in relation to the conveying direction of the conveyor, and where the activating member is an electrically driven stepping motor or servomotor.

By mounting a number of apparatuses in connection with an overhead conveyor, it is furthermore possible to throw off items suspended in hook members in the conveyor whereby it is possible in this way to sort the items according to the desired weight.

An alternative to a discharge arm can be a push arm having a push-off plate which from a side of the conveyor belt has an approximately linear route of motion in the transverse direction of the conveyor.

BRIEF DESCRIPTION OF THE DRAWINGS

The invention is explained in more detail below with reference to the drawing in which.

DETAILED DESCRIPTION OF THE INVENTION

Figure 1:
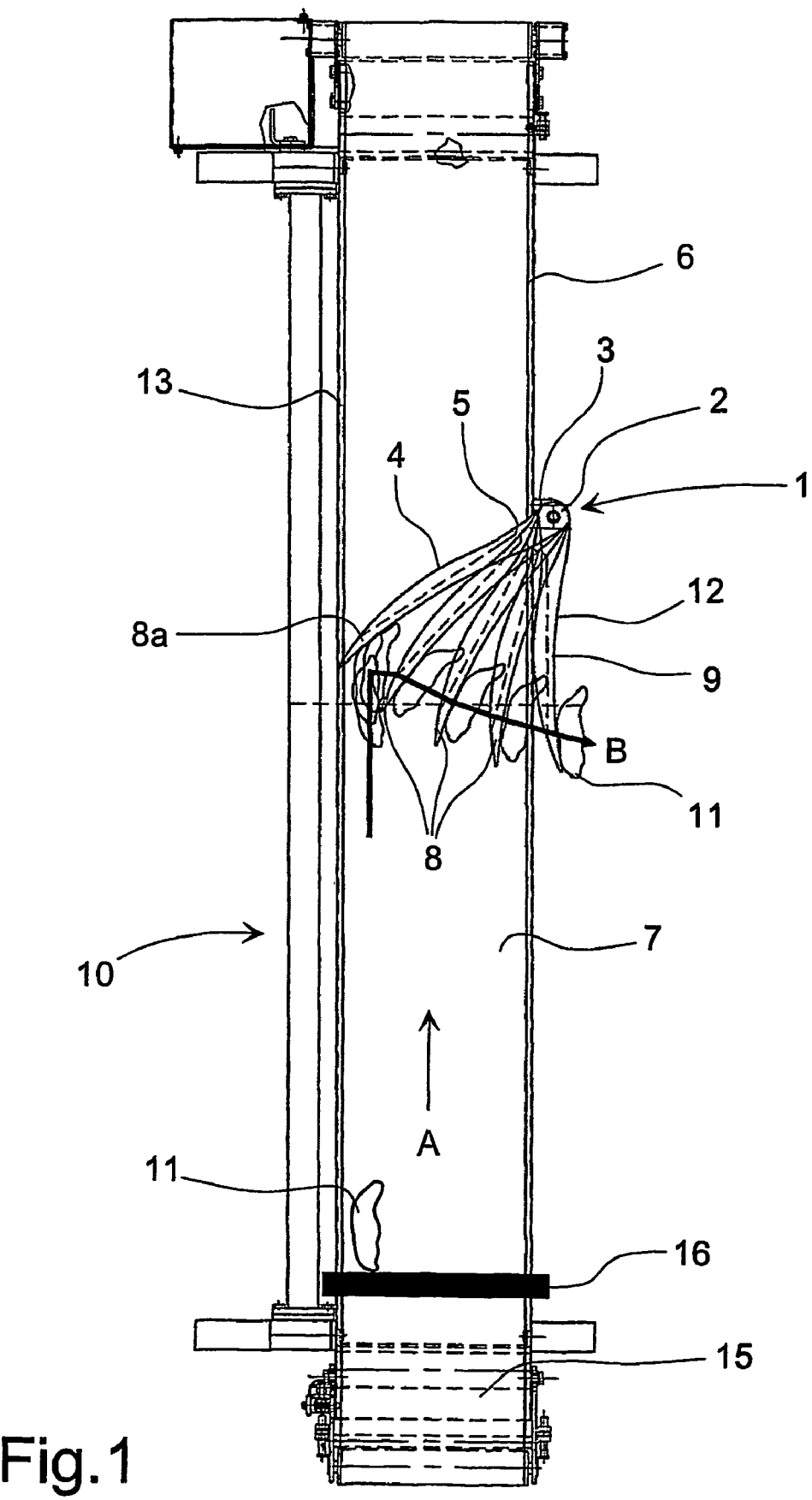
FIG. 1 shows a plane view of a conveyor having an embodiment of an apparatus according to the invention, shown with an item having a specific lateral position when being led out from the conveyor.
Figure 2:
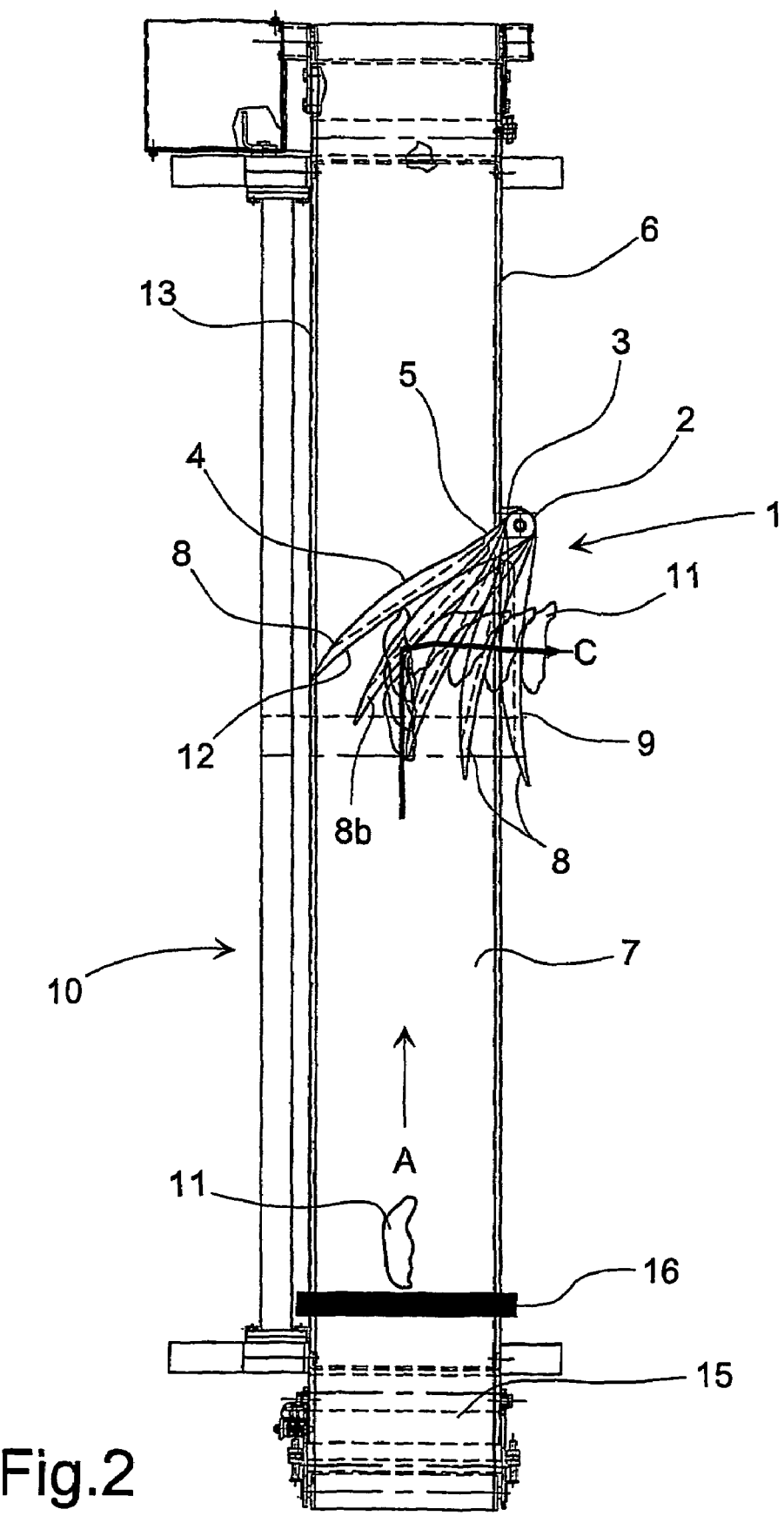
FIG. 2 shows a conveyor with an apparatus, (compared to FIG. 1) shown with an item having another lateral position when being led out from the conveyor.
Figure 3:
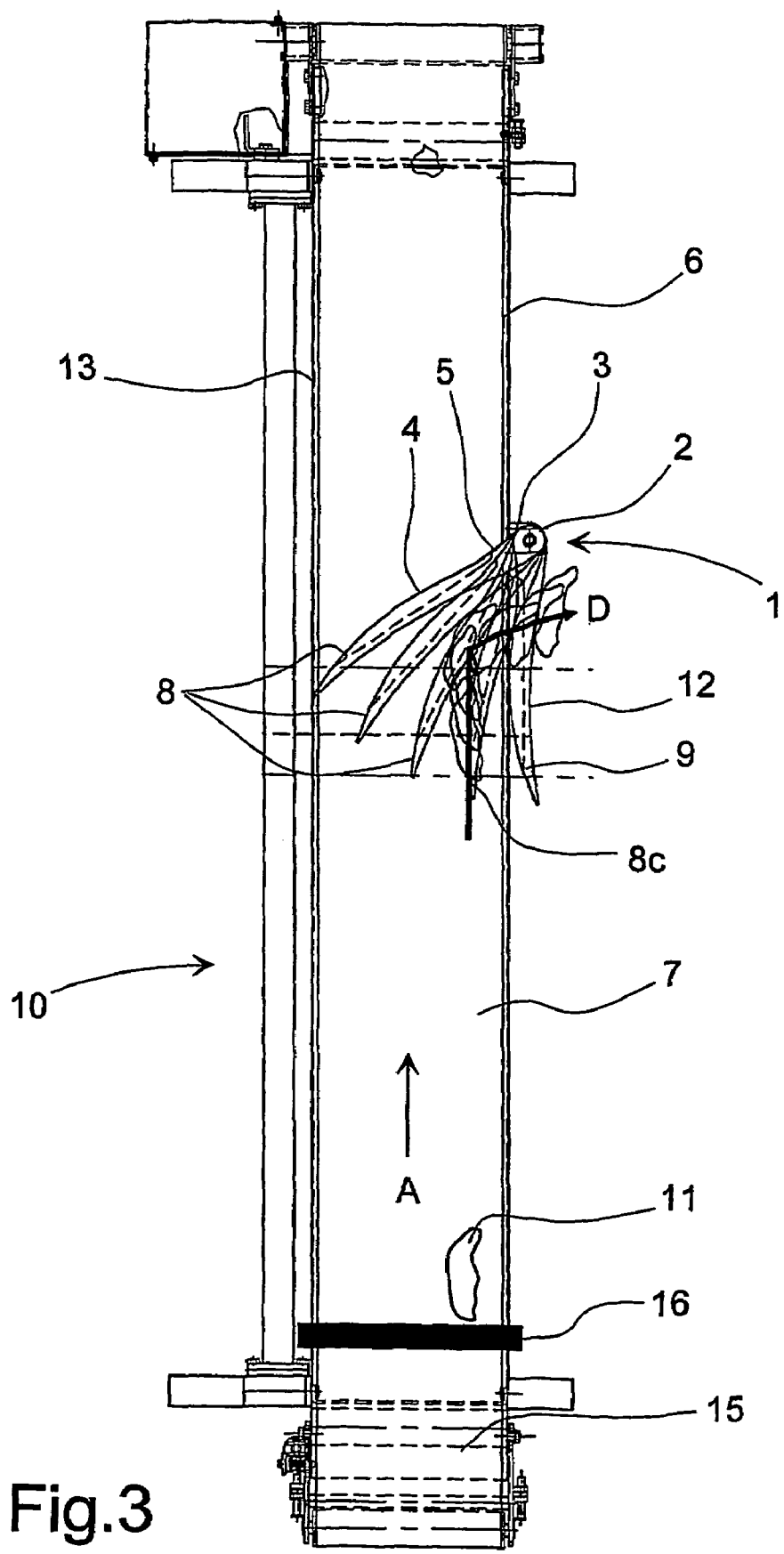
FIG. 3 shows a conveyor with an apparatus, (compared to FIG. 1) shown with an item having a third lateral position when being led out from the conveyor.

FIGS. 1-3 show an apparatus I for a sorting system 10 comprising an activating member 2, a fastening bracket 3, and a discharge arm 4 which at an end part 5 is pivotally connected with the fastening bracket 3 at a side 6 of a conveyor 7. By means of the activating member 2, the discharge arm 4 can be swung between a passive position 9 approximately parallel to the side 6 of the conveyor 7 and a number of active angular positions 8 in relation to a conveying direction A of the conveyor 7.

FIG. 1 shows an item 11 placed along an opposite side edge 13 of the conveyor 7. In order to have the item 11 conveyed to the discharge position B, the discharge arms is turned to the angular position 8a. The item 11 hits the spoon-formed front 12 of the discharge arm 4 whereby the item either is thrown to the discharge position B or is led to discharge position B by the discharge arm 4 when the discharge arm 4 is swung back to its passive position 9.

FIG. 2 shows an item 11 placed approximately in the middle of the conveyor 7 where the discharge arm 4 is turned to the angular position 8b in order to guide the item 11 to a discharge position C.

FIG. 3 shows an item 11 placed close to the edge 6 of the conveyor 7 where the discharge arm 4 is turned to the angular position 8c in order to guide the item 11 to a discharge position D.

The three figures show that by means of an apparatus 1 it is possible to have an item 11 conveyed to three different discharge position B, C, and D by turning the discharge arm 4 into different angular positions 8a, 8b, and 8c. It will furthermore be possible to turn the discharge arm 4 to angular positions 8 so that the item 11, irrespective of is lateral position on the conveyor 7, will be led to the same discharge position, for example discharge position C.

At an end 15 of the conveyor 7, sensors 16 are placed which register the lateral and longitudinal position of the item 11 on the conveyor 7. As shown, the sensors 16 are preferably placed on a transverse bridge across the conveyor 7, and they may as an alternative or as a supplement be placed along the side of the conveyor 7. Another possibility is that the sensors in the form of photoelectric sensors and/or laser sensors are placed on a three-dimensional bridge extending slopingly across the conveyor 7, or extending both transversely of and along the conveyor 7.

The invention claimed is:

1. A sorting system comprising an activating member, a fastener coupled to the activating member, and a discharge arm with an end part, the end part being pivotally connected with the fastener at a side of a conveyor, the activating member swinging the discharge arm between a passive position approximately parallel to a side of the conveyor and active angular positions relative a conveying direction of the conveyor, and sensors for providing signals for determining a lateral and longitudinal position of at least one item on the conveyor; and the activating member comprising an electrically driven stepping motor or servomotor including a control unit for determining a pattern of motion and/or speed profile of the discharge arm; and wherein the control unit receives at least one signal from the sensors used for determining the lateral and longitudinal position of the at least one item on the conveyor.

2. A sorting system according to claim 1, wherein the sensors comprise photoelectric cells placed above and/or along the conveyor.

3. A sorting system according to claim 2, wherein the stepping motor or servomotor comprises a pre-programmed control unit being adapted for utilizing the control signal from the sensors for determining the pattern of motion and/or the speed profile of the discharge arm.

4. A sorting system according to claim 2, wherein the discharge arm is provided with a spoon-shaped front.

5. A method for sorting items on the conveyor with the system according to claim 2, comprising:
weighing and/or quality/type grading the items before placement on the conveyor, or weighing and/or quality/type grading the items on a first part of the conveyor;
passing the items past the sensors placed above or along the conveyor;
registering the size and/or lateral and longitudinal position of the items on the conveyor with the sensors, and at a same time, providing a signal from the sensors to the control unit;
before the items reach the discharge arm,
turning the discharge arm from a passive position to an active angular position in relation to the conveying direction of the conveyor; and
leading the items to a predetermined discharge position along the side of the conveyor with the discharge arm.

6. A sorting system according to claim 1, wherein the sensors comprise laser sensors placed above and/or along the conveyor.

7. A sorting system according to claim 6, wherein the stepping motor or servomotor comprises a pre-programmed control unit being adapted for utilizing the control signal from the sensors for determining the pattern of motion and/or the speed profile of the discharge arm.

8. A sorting system according to claim 6, wherein the discharge arm is provided with a spoon-shaped front.

9. A method for sorting items on the conveyor with the system according to claim 6, comprising:
weighing and/or quality/type grading the items before placement on the conveyor, or weighing and/or quality/type grading the items on a first part of the conveyor;
passing the items past the sensors placed above or along the conveyor;
registering the size and/or lateral and longitudinal position of the items on the conveyor with the sensors, and at a same time, providing a signal from the sensors to the control unit;
before the items reach the discharge arm,
turning the discharge arm from a passive position to an active angular position in relation to the conveying direction of the conveyor; and
leading the items to a predetermined discharge position along the side of the conveyor with the discharge arm.

10. A sorting system according to claim 1, wherein the sensors comprise photoelectric cells and/or laser sensors placed above and/or along the conveyor.

11. A sorting system according to claim 10, wherein the stepping motor or servomotor comprises a pre-programmed control unit being adapted for utilizing the control signal from the sensors for determining the pattern of motion and/or the speed profile of the discharge arm.

12. A sorting system according to claim 10, wherein the discharge arm is provided with a spoon-shaped front.

13. A method for sorting items on the conveyor with the system according to claim 10, comprising:
weighing and/or quality/type grading the items before placement on the conveyor, or weighing and/or quality/type grading the items on a first part of the conveyor;
passing the items past the sensors placed above or along the conveyor;
registering the size and/or lateral and longitudinal position of the items on the conveyor with the sensors, and at a same time, providing a signal from the sensors to the control unit;
before the items reach the discharge arm,
turning the discharge arm from a passive position to an active angular position in relation to the conveying direction of the conveyor; and
leading the items to a predetermined discharge position along the side of the conveyor with the discharge arm.

14. A sorting system according to claim 1, wherein the stepping motor or servomotor comprises a pre-programmed control unit utilizing the control signal from the sensors for determining the pattern of motion and/or the speed profile of the discharge arm.

15. A sorting system according to claim 14, wherein the discharge arm is provided with a spoon-shaped front.

16. A method for sorting items on the conveyor with the system according to claim 14, comprising:
weighing and/or quality/type grading the items before placement on the conveyor, or weighing and/or quality/type grading the items on a first part of the conveyor;
passing the items past the sensors placed above or along the conveyor;
registering the size and/or lateral and longitudinal position of the items on the conveyor with the sensors, and at a same time, providing a signal from the sensors to the control unit;
before the items reach the discharge arm,
turning the discharge arm from a passive position to an active angular position in relation to the conveying direction of the conveyor; and
leading the items to a predetermined discharge position along the side of the conveyor with the discharge arm.

17. A sorting system according to claim 1, wherein the discharge arm is provided with a spoon-shaped front.

18. A method for sorting items on the conveyor with the system according to claim 1, comprising:
weighing and/or quality/type grading the items before placement on the conveyor, or weighing and/or quality/type grading the items on a first part of the conveyor;
passing the items past the sensors placed above or along the conveyor;
registering the size and/or lateral and longitudinal position of the items on the conveyor with the sensors, and at a same time, providing a signal from the sensors to the control unit;
before the items reach the discharge arm,
turning the discharge arm from a passive position to an active angular position in relation to the conveying direction of the conveyor; and
leading the items to a predetermined discharge position along the side of the conveyor with the discharge arm.

19. A method according to claim 18, wherein apparatuses are arranged in a row along a side of the conveyor and are operated by the sensors and by the control unit as a common control unit.

20. A method for sorting items on the conveyor with the system according to claim 1, comprising:
the items are either weighed and/or quality/type graded before being placed on the conveyor, or weighed and/or quality/type graded on a first part of the conveyor; the items pass the sensors placed above or along the conveyor; the sensors register the size and/or lateral and longitudinal position of the items on the conveyor, and at a same time, the sensors provide a control signal to the control unit of the apparatus; before the items reach the discharge arm, the discharge arm is turned from a passive position to an active angular position in relation to the conveying direction of the conveyor; and the discharge arm leads the items to a predetermined discharge position along the side of the conveyor.

* * * * *